Patented Oct. 7, 1947

2,428,733

UNITED STATES PATENT OFFICE 2,428,733

PROCESS FOR THE PREPARATION OF ORGANIC SULFONYL CHLORIDES

Friedrich Asinger, Leuna, Germany, assignor, by mesne assignments, to General Aniline & Film Corporation, New York, N. Y., a corporation of Delaware No Drawing. Application May 9, 1939, Serial No. 272,725. In Germany May 13, 1938

6 Claims. (Cl. 204—162)

The present invention relates to capillary-active substances and a process of producing them.

I have found that valuable capillary-active substances can be obtained by subjecting to alkaline saponification products obtained by allowing gaseous or vaporous chlorine and sulfur dioxide to act on saturated aliphatic hydrocarbons having at least 8 carbon atoms in the molecule only, to such an extent that about half or less of the initial hydrocarbons are converted into products containing oxygen, chlorine and sulfur. For the saponification it is preferable to use alkali metal hydroxide solutions which are not more concentrated than 15 per cent. Alkali metal carbonate solutions, and alkaline earth metal hydroxides may also be used. The undissolved portion may be subjected again to the treatment above described.

Very active capillary-active compounds are obtained by using mainly straight-chain, paraffinic hydrocarbons having at least 10 carbon atoms in the molecule. Such hydrocarbons are readily accessible for example by hydrogenation without pressure of carbon monoxide in the presence of catalysts such as cobalt catalysts. Unitary hydrocarbons, such as dodecane, tetradecane or octodecane, or fractions of mineral oils or hydrogenation products of coals, may also be used as initial materials.

The process may be carried out by treating a hydrocarbon mixture (as for example an oil consisting of straight-chain paraffinic hydrocarbons obtained by hydrogenation without pressure of carbon monoxide and preferably freed from unsaturated and oxygen-containing compounds) at room temperature, if desired while irradiating, with short-wave light, with a slow stream of chlorine and sulfur dioxide, the gases advantageously being introduced in fine dispersion through nozzles at the bottom of the reaction vessel into the reaction liquid which is kept in motion by stirring or circulatory pumping. The progress of the reaction may be followed by the determination of the hydrolyzable chlorine by saponifying a sample of the mixture with 2 per cent caustic soda solution and determining the chlorine split off.

After about half of the initial hydrocarbons have been converted into products containing chlorine and sulfur, the treatment is interrupted and the reaction product freed from hydrogen chloride formed and any dissolved sulfur dioxide, preferably by blowing out with inert gases or by evacuation. Working may also be effected continuously by leading the hydrocarbons through the treatment vessel at such a speed of flow that the desired degree of reaction is obtained.

In the saponification of the resulting product, sometimes difficulties arise if concentrated alkaline solutions are used. For example very stable emulsions of the insoluble constituents form which can only be broken up with difficulty. Contrary to expectation, this drawback is not encountered when less strong solutions are used, as for example solutions of less than 15 per cent strength. The procedure may be for example that a product formed by the treatment with chlorine and sulfur dioxide is allowed to flow slowly at from 80 to 90° C. into an about 5 per cent caustic soda solution while stirring. After allowing to stand for a short time at 80° C. the emulsion first formed separates readily.

The clear aqueous solution obtained by the hydrolysis is evaporated to dryness in suitable manner; the oil which has not passed into solution during the treatment with alkaline solution is preferably treated again with chlorine and sulfur dioxide.

The pale, sometimes yellowish colored, substances obtained in the said manner may be obtained in powder form. They dissolve in water giving a clear solution. The solutions foam strongly and have an excellent wetting and washing power, for example for cotton and wool. The resulting substances may also be used as emulsifying agents; on the other hand they may also be used with advantage for breaking emulsions, as for example crude oil emulsions.

The following examples will further illustrate how my said invention may be carried out in practice but the invention is not restricted to these examples.

Example 1

60 litres of an oil having the boiling range of 200° to 370° C. and a density of 0.768 at 20° C. (obtained by hydrogenation of carbon monoxide at atmospheric pressure and subjected to a subsequent hydrogenation) are treated at room temperature in a vessel closed by glass premeable to ultra-violet light, while being irradiated with a mercury vapor lamp, with 700 grams of chlorine and 700 grams of sulfur dioxide per hour. After 10 hours, about half of the oil has been converted into a product containing sulfur, chlorine and oxygen and having a content of 5.7 per cent of hydrolyzable chlorine. The reaction product is freed from dissolved hydrogen chloride and sulfur dioxide by evacuation and introduced at 90° C. while stirring into an amount of 5 per cent caustic soda solution rather more than that calculated with reference to the hydrolyzable chlorine. After allowing to stand for three hours at 80° C., the resulting clear solution is separated from the oil layer and evaporated; the salt pulp thus obtained is dried in vacuo and powdered. A white product is obtained which is soluble in water giving a clear solution and which has an excellent wetting action, for example for cotton.

If the treatment of the same initial material with chlorine and sulfur dioxide under the said conditions be carried on until the whole of the oil has been converted (corresponding to a content of 13 per cent of hydrolyzable chlorine), a product is obtained of which, to obtain the same wetting action, more than twice the amount must be used than of the product obtained according to paragraph 1.

*Example 2*

15 liters of an oil of a boiling range of from 280 to 345° C., an average molecular weight of about 254 and a density of 0.771 at 20° C. which has been obtained by hydrogenation of carbon monoxide under ordinary pressure and, besides, subjected to a subsequent hydrogenation, are treated at 25° C. with 200 grams of chlorine and 200 grams of sulfur dioxide per hour while being irradiated with a mercury vapor lamp. After 11 hours the product contains 6.5 per cent of hydrolyzable chlorine. After having freed the reaction mixture from dissolved hydrogen chloride and sulfur dioxide by evacuation it is introduced at 90° C. into a 5 per cent caustic soda solution. The clear solution is stirred for 3 hours and then allowed to stand, whereafter it is separated off from the oil layer while warm and evaporated. The sulphonation product is dried and powdered. Thus a clearly water-soluble, almost colorless powder is obtained which has a wetting action of 0.63 gram per liter (wetting powder means the amount in grams of wetting agent per liter necessary to cause a circular piece of cotton fabric of 3 centimeters' diameter to sink after 120 seconds).

If the treatment with chlorine and sulfur dioxide is continued under the above conditions until the end product has a content of 10.3 per cent of hydrolyzable chlorine, what is the case after about 19 hours, there is obtained after saponification an end product with a wetting power of 1.3 grams.

*Example 3*

60 liters of a petroleum fraction purified by a subsequent hydrogenation, boiling at from 230 to 310° C., having an average molecular weight of about 210 and a density of 0.815 at 20° C. are treated at 25° C. for 9 hours with 700 grams of chlorine and 700 grams of sulfur dioxide per hour according to the manner described in Example 2. Thus a product is obtained with a content of about 6 per cent of hydrolyzable chlorine. After separating the product from dissolved hydrogen chloride and sulfur dioxide, saponifying with 5 per cent caustic soda solution, separating off from neutral oil, evaporating, drying and grinding, a brownish colored product is obtained which is soluble in water giving a clear solution and which has an excellent wetting power, for example for cotton.

If the treatment with chlorine and sulfur dioxide under the same conditions is continued until practically the whole of the oil is converted (corresponding to a content of about 11.3 per cent of hydrolyzable chlorine) a product is obtained of which more than twice the amount must be employed, to obtain the same wetting action, as of the product according to paragraph 1.

*Example 4*

60 liters of a hydrocarbon oil with the boiling range of from 240 to 310° C., an average molecular weight of about 210 and a density of about 0.765 at 20° C. (obtained by hydrogenation of carbon monoxide under ordinary pressure and subjected to a subsequent hydrogenation) are treated with 700 grams of chlorine and 700 grams of sulfur dioxide per hour in the manner described in Example 2. After 10 hours a product is obtained with a content of about 6.5 per cent of hydrolyzable chlorine. After degasifying, the product is introduced into 5 per cent caustic soda solution. After allowing to stand in the heat the clear solution is separated off from the oil layer. The salt pulp is dried in vacuo and powdered. A colorless powder is obtained which is soluble in water giving a clear solution and which has an excellent wetting action, for example for cotton.

If the treatment with sulfur dioxide and chlorine is continued under the same conditions until practically the whole of the oil is converted (corresponding to a content of about 11 per cent of hydrolyzable chlorine) there is obtained a product of which more than twice the amount must be used, to obtain the same wetting action, as of the above product.

*Example 5*

60 liters of a petroleum fraction purified by a subsequent hydrogenation, which boils at from 280 to 345° C. and which has an average molecular weight of about 254 and a density of 0.853 at 20° C. are treated with 700 grams of chlorine and 700 grams of sulfur dioxide for 9 hours in the manner described in Example 4. Thus a product is obtained which contains about 6 per cent of hydrolyzable chlorine. After saponifying, evaporating and drying the product is soluble in water giving a clear solution and having an excellent foaming and wetting power.

If the treatment with sulfur dioxide and chlorine is continued until the end product contains about 10 per cent of hydrolyzable chlorine a product is obtained after saponification of which more than twice the amount must be used as of the product obtained according to paragraph 1, to obtain the same wetting action.

What I claim is:

1. The process of preparing organic sulfonyl chlorides which comprises mixing saturated aliphatic hydrocarbons having at least 8 carbon atoms with sulfur dioxide and chlorine, the two latter being in approximately equal parts by weight, irradiating the mixture with actinic rays from a mercury vapor lamp thereby bringing about the formation of hydrocarbon sulfonyl chlorides, continuing the reaction for a sufficient length of time to produce substantial quantities of said sulfonyl chlorides, and stopping the reaction when less than about one half of the initial hydrocarbons have been reacted.

2. The process of preparing hydrocarbon sulfonyl chlorides which upon saponification have excellent wetting action, which comprises mixing saturated aliphatic hydrocarbons having at least 8 carbon atoms with sulfur dioxide and chlorine, the proportion of sulfur dioxide to chlorine being maintained sufficiently high to insure the formation of said sulfonyl chlorides, irradiating the mixture with light thereby bringing about the formation of said hydrocarbon sulfonyl chlorides, continuing the reaction for a sufficient length of time to produce substantial quantities of said sulfonyl chlorides and stopping the reaction when not substantially more than one-half of the initial hydrocarbons have been reacted.

3. The process of preparing hydrocarbon sulfonyl chlorides which upon saponification have excellent wetting action, which comprises mixing at room temperature saturated aliphatic hydrocarbons having at least 8 carbon atoms with sulfur dioxide and chlorine, the proportion of sulfur dioxide to chlorine being maintained sufficiently high to insure the formation of said sulfonyl chlorides, irradiating the mixture with light thereby bringing about the formation of said hydrocarbon sulfonyl chlorides, continuing the reaction for a sufficient length of time to produce substantial quantities of said sulfonyl chlorides and stopping the reaction when not substantially more than one-half of the initial hydrocarbons have been reacted.

4. The process of preparing hydrocarbon sulfonyl chlorides which upon saponification have excellent wetting action, which comprises mixing saturated aliphatic hydrocarbons having at least 10 carbon atoms in the molecule with sulfur dioxide and chlorine, the proportion of sulfur dioxide to chlorine being maintained sufficiently high to insure the formation of said sulfonyl chlorides, irradiating the mixture with light thereby bringing about the formation of said hydrocarbon sulfonyl chlorides, continuing the reaction for a sufficient length of time to produce substantial quantities of said sulfonyl chlorides and stopping the reaction when not substantially more than about one-half of the initial hydrocarbons have been reacted.

5. The process of preparing hydrocarbon sulfonyl chlorides which upon saponification have excellent wetting action, which comprises mixing at room temperature saturated aliphatic hydrocarbon mixtures having a boiling range from 200°–370° C., obtained by hydrogenation of carbon monoxide without pressure in the presence of a catalyst with sulfur dioxide and chlorine, the proportion of sulfur dioxide to chlorine being maintained sufficiently high to insure the formation of said sulfonyl chlorides, irradiating the mixture with light thereby bringing about the formation of said hydrocarbon sulfonyl chlorides, continuing the reaction for about 10 hours and stopping the reaction when not substantially more than about one-half of the initial hydrocarbons have been reacted.

6. The process of preparing hydrocarbon sulfonyl chlorides which upon saponification have excellent wetting action, which comprises mixing at room temperature a petroleum fraction hydrocarbon mixture which boils at from 280°–345° C. and has an average molecular weight of about 254 with sulfur dioxide and chlorine, the proportion of sulfur dioxide to chlorine being maintained sufficiently high to insure the formation of said sulfonyl chlorides, irradiating the mixture with light thereby bringing about the formation of said hydrocarbon sulfonyl chlorides, continuing the reaction for about 9 hours and stopping the reaction when not substantially more than one-half of the initial hydrocarbons have been reacted.

FRIEDRICH ASINGER.

REFERENCES CITED

The following references are of record in the file of this patent:

UNITED STATES PATENTS

| Number | Name | Date |
| --- | --- | --- |
| Re. 20,968 | Reed | Jan. 3, 1939 |
| 2,174,507 | Tinker et al. | Sept. 26, 1939 |
| 2,193,824 | Lockwood et al. | Mar. 19, 1940 |
| 2,202,791 | Fox et al. | May 28, 1940 |
| 2,046,090 | Reed et al. | June 30, 1936 |
| 1,963,181 | Egloff et al. | June 12, 1934 |
| 1,362,355 | Saunders et al. | Dec. 14, 1920 |